United States Patent
Gilmour et al.

(10) Patent No.: US 6,877,373 B2
(45) Date of Patent: Apr. 12, 2005

(54) ELECTROSTATIC CHARGE CONTROL FOR IN-TANK MODULES

(75) Inventors: Daniel L. Gilmour, West Hartford, CT (US); John R. Forgue, Cheshire, CT (US); David H. Ford, Canton, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 0 days.

(21) Appl. No.: 10/441,213

(22) Filed: May 19, 2003

(65) Prior Publication Data

US 2004/0011129 A1 Jan. 22, 2004

Related U.S. Application Data

(60) Provisional application No. 60/385,185, filed on May 31, 2002.

(51) Int. Cl.$^7$ ................................ G01F 23/60
(52) U.S. Cl. ...................... 73/313; 73/290 R
(58) Field of Search ............... 73/313, 314, 290 R, 73/305

(56) References Cited

U.S. PATENT DOCUMENTS 4,157,038 A * 6/1979 Yamamoto .................. 73/313
5,076,920 A 12/1991 Danowski et al.
5,164,879 A 11/1992 Danowski et al.
5,642,718 A 7/1997 Nakai et al.
5,647,330 A 7/1997 Sawert et al.
5,785,032 A 7/1998 Yamashita et al.
6,047,685 A 4/2000 Schelhas et al.
6,168,713 B1 1/2001 Sekine et al.
6,206,035 B1 3/2001 Wehner et al.
6,435,163 B1 8/2002 Fauser et al.
6,464,870 B1 10/2002 Castellanos et al.
2002/0124833 A1 9/2002 Fauser et al.
2003/0131828 A1 7/2003 Crary

FOREIGN PATENT DOCUMENTS

JP 8232792 9/1996
JP 9032674 2/1997

* cited by examiner

*Primary Examiner*—Hezron Williams
*Assistant Examiner*—Rodney Frank
(74) *Attorney, Agent, or Firm*—Jenner & Block LLP (57) ABSTRACT

An in-tank fuel module for a fuel tank having a conductive lead for connection to an electrical ground plane and at least a first electrically conductive component, and a conductive polymeric strand electrically connecting the component to the lead. A jet aspiration pump is made of conductive polymeric material. A conductive component is connected to the ground plane through the fuel level sensing assembly circuit.

5 Claims, 7 Drawing Sheets

ELECTROSTATIC CHARGE CONTROL FOR IN-TANK MODULES

This application claims the benefits under Title 35 USC § 120 based on U.S. Provisional Application No. 60/385,185, filed on May 31, 2002.

BACKGROUND OF THE INVENTION

The present invention relates to in-tank fuel modules having components made of plastic or polymeric materials. More specifically, it relates to in-tank fuel modules arranged to prevent the accumulation of and provide for the safe dissipation of electrostatic charges that might be generated as a result of fuel flow.

The in-tank fuel module for a fuel tank of a vehicle or other device employing an internal combustion engine typically includes a plurality of separate components, such as a reservoir, a fuel pump and motor, fuel filter and housing, a pressure regulator and housing, an aspiration jet pump and the like. It can happen that such components are made of non-conductive materials or may include elements that are electrically conductive; but, the electrically conductive element is electrically insulated from the associated electrical circuit that defines a ground plane. For instance, the conductive component may be disposed within a non-conductive plastic body.

Conductive, as well as non-conductive components of an in-tank fuel module are susceptible of accumulating an electrostatic charge. It is-well known to employ an arrangement that provides for dissipation of such static charge to prevent excessive build-up. Various examples are described in U.S. Pat. Nos. 5,076,920; 5,647,330; 5,785,032; 6,047,685; 6,206,035 and 6,435,163.

As the investigation of electrostatic charge build-up in in-tank fuel modules proceeds, refinements in the overall scheme for protection evolve. The present invention results from this process. Not only does it recognize the advantage to be derived from implementing such protection in areas not previously considered significant, it also provides enhanced mechanisms for accomplishing an overall improvement in the protection afforded.

Specifically, an arrangement is provided to protect against build-up of electrostatic charge in areas not heretofore considered relevant to the solution of electrostatic discharge problem. One such area is the aspiration jet pump employed to aspirate fuel into the module reservoir. Another is the conductive arm of the fuel level sensing assembly. The invention further provides previously unknown mechanisms to provide charge dissipation capability.

To control build-up of the electrostatic charge in the components of an in-tank fuel module, it is known in the art to electrically connect the component to the vehicle ground plane, usually to the negative terminal of the battery that defines that electrical plane. It is known to use metal wires to electrically connect the components to the ground, or to other grounded conductive components that are connected to the vehicle ground plane. It is contemplated by this invention to provide new arrangements for providing such a ground path.

The fuel level sensor detects the fuel level in a fuel tank, usually through a float and pivotal arm physically located in or on the in-tank fuel module. An electric circuit having a variable resistance card is used. A movable cross bar or contact member coacts with the resister card to alter the circuit characteristics to change the reading on a fuel gauge. This circuit includes an electrical path that is extant within the module and is ultimately connected to the ground plane. It provides a previously unrecognized path for electrostatic charge dissipation.

Moreover, the fuel level sensor assembly usually includes a metallic float arm mounted on a non-conductive wiper retainer. The arm has a buoyant member at one end. The retainer is pivotally mounted on a base that is also non-conductive. Since the float arm is formed of a metallic material, the float arm is susceptible of collecting electrostatic charge. However, since the wiper retainer and the base are formed of a non-conductive plastic, any electrostatic charge collected in the metallic arm is unable to dissipate to the circuit ground plane. Connection of the metallic float arm to the conductor of the level sensor circuit resident in the module is a solution to both the problem of undesirable electrostatic accumulation and provision of an effective electrostatic charge dissipation path.

DETAILED DESCRIPTION OF THE ILLUSTRATED EMBODIMENTS

Figure 1:
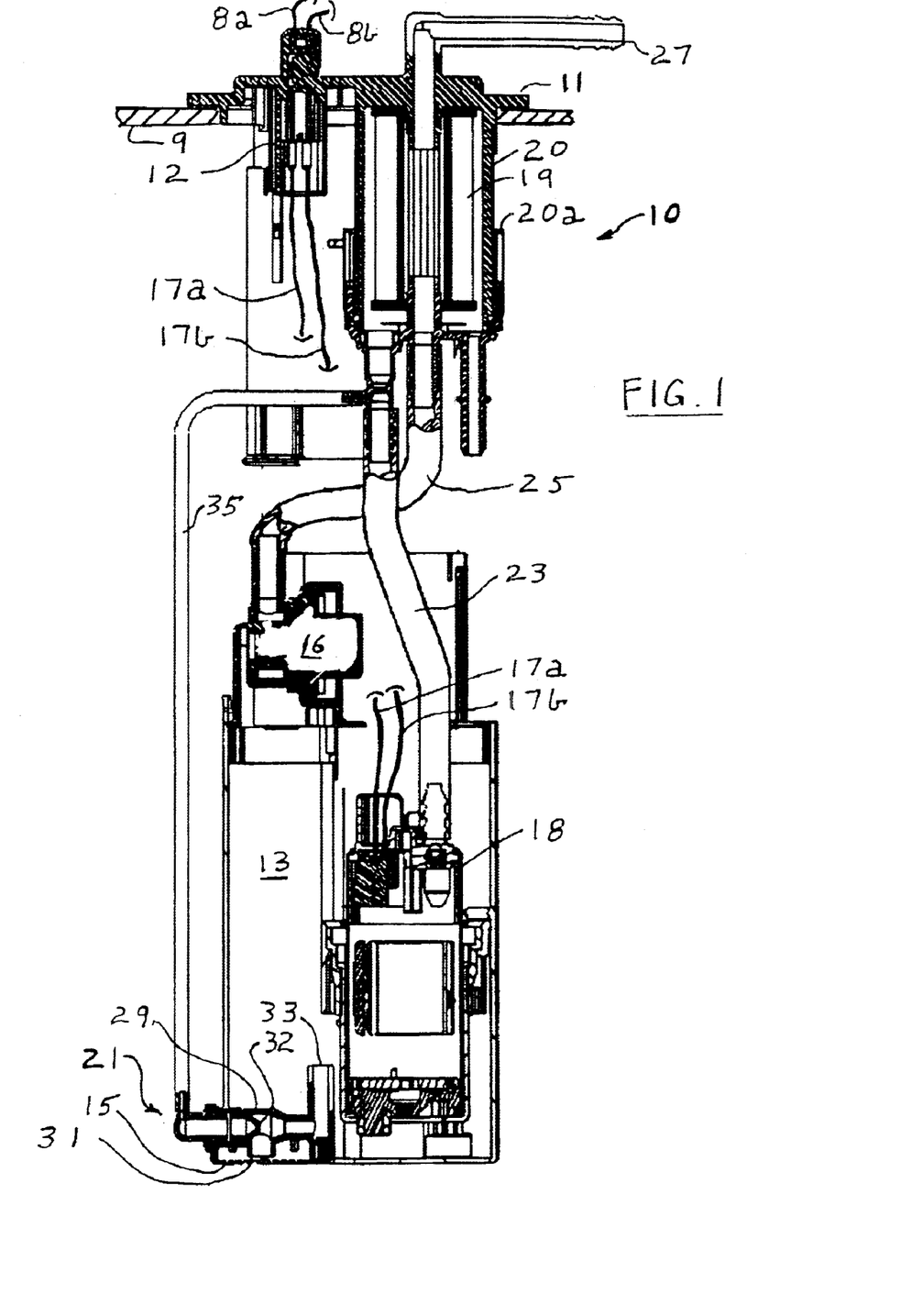
FIG. 1 is a front view, partially in cross section, and partially broken away, of an in-tank fuel module illustrating various principles of the present invention.

In the embodiment of FIG. 1, one aspect of the present invention is illustrated. Here, there is disclosed an in-tank fuel module 10 adapted to be positioned in a fuel tank 9 associated with an internal combustion engine. Though the main application of such an arrangement is for a vehicle, the invention has application to other apparatus powered by an internal combustion engine, such as a stationary or auxiliary power unit, engine driven pump or electric generator.

The module 10 includes a flange 11 connecting the module to fuel tank 9. The module further includes a fuel reservoir 13, a fuel pump and motor 18, a fuel filter housing 20 in which there is positioned a fuel filter 19, a fuel pressure regulator 16, and an aspiration jet pump 21. These components are connected by hoses 23 or 25. The module communicates fuel from the main tank 9 to the vehicle engine though the pump and motor 18 to the filter housing 20 for delivery to the engine through an outlet connector 27.

Flange 11 supports an electrical receptacle 12. It receives power from the electrical system associated with the engine. The electrical system includes leads 8a and 8b that plug into receptacle 12. One lead, 8a, represents the negative side of the battery of the electrical system and is considered representative of the system ground plane.

Fuel pump and motor 18 are supported in the reservoir 13. Power to the motor is supplied through electrical leads 17a and 17b connected to electrical receptacle 12. Lead 17a is connected to the negative lead 8a and is thus connected to the vehicle ground plane. Lead 17b is connected to the positive side of the battery through lead 8b and is considered the "hot" or power lead.

The flange 11 and reservoir 13 are connected by a relatively slidable connection to permit adjustment of the overall vertical extent of the module. This slidable connection is not shown, but is well known in the art. It permits the reservoir 13 to move toward or away from flange 11 for association of the module with fuel tanks of different vertical height.

In the module illustrated, the fuel filter housing 20 and included filter 19 are connected to the flange 11. In other arrangements, the filter housing may be connected to the reservoir 13.

As shown in FIG. 1, the filter housing 20 supports filter 19. Fuel enters the filter housing 20 from hose 23 that is connected to the pump and motor 18. Pressurized fuel passes through the filter 19 and exits the filter through outlet connector 27 for delivery to the engine.

To prevent build-up of electrostatic charge and provide for its dissipation, the lower portion 20a of filter housing 20 may be made of non-conductive polymeric material such as acetal with a conductive filler. This conductive portion 20a of the housing 20 is connected to the vehicle ground plane at lead 17a in a well known manner by an insulated metal wire (not shown). Of course, any other form of connection of the conductive portion 20a to the electrical circuit ground plane would be acceptable.

The reservoir 13 maintains a level of fuel for supply to the fuel pump and motor 18. It includes an inlet defined by a screen 15 at the bottom of the reservoir maintained in spaced relation to the tank bottom. Fuel enters the inlet 15 from fuel tank 9, usually as a result of the head from the quantity of fuel in the tank 9. When the level of fuel in the fuel tank is low, jet aspiration pump 21 draws, or aspirates, fuel from the fuel tank 9 into the reservoir 13.

After fuel passes through filter 19, it can also exit the housing 20 through hose 25 to pressure regulator 16. The regulator controls pressure of the fuel delivered to the engine through the outlet connector 27 by passing some fuel back to the reservoir 13 when the pressure exceeds a set amount. This is a supply side jet pump system. The invention here, is of course, applicable to systems with return side jet pumps.

Jet aspiration pump 21 includes a body 29 that is hollow and defines a restricted orifice or venturi. The body also defines an inlet 31 open to the fuel in the tank 9 at the reservoir inlet 15, and an outlet 33 open to the reservoir 13.

High pressure fuel in hose 25 is delivered through another hose 35 to the jet orifice 32 which directs flow at high speed to the venturi at 90 degrees to the fuel path entering the inlet 19. The flowing fuel aspirates fuel from tank 9 into the inlet 31 of body 29. That fuel is delivered to the reservoir 13 through outlet 33.

In accordance with the present invention, aspirator jet pump 21 is made of conductive polymeric material such as acetal with carbon fibril, or other conductive filler or nylon with a suitable conductive filler. Such conductive material is used to form the body 29 including the venturi and the portions of the body defining inlet 31 and outlet 33. The aspiration jet pump 21 is connected to the ground plane using any suitable means, such as insulated metal wire. Alternatively, the entire reservoir 13 and other module components could be molded of conductive polymeric material to provide a dissipation path for any electrostatic charge that might be generated as a result of fuel flow in the aspiration jet pump 21.

Figure 2:
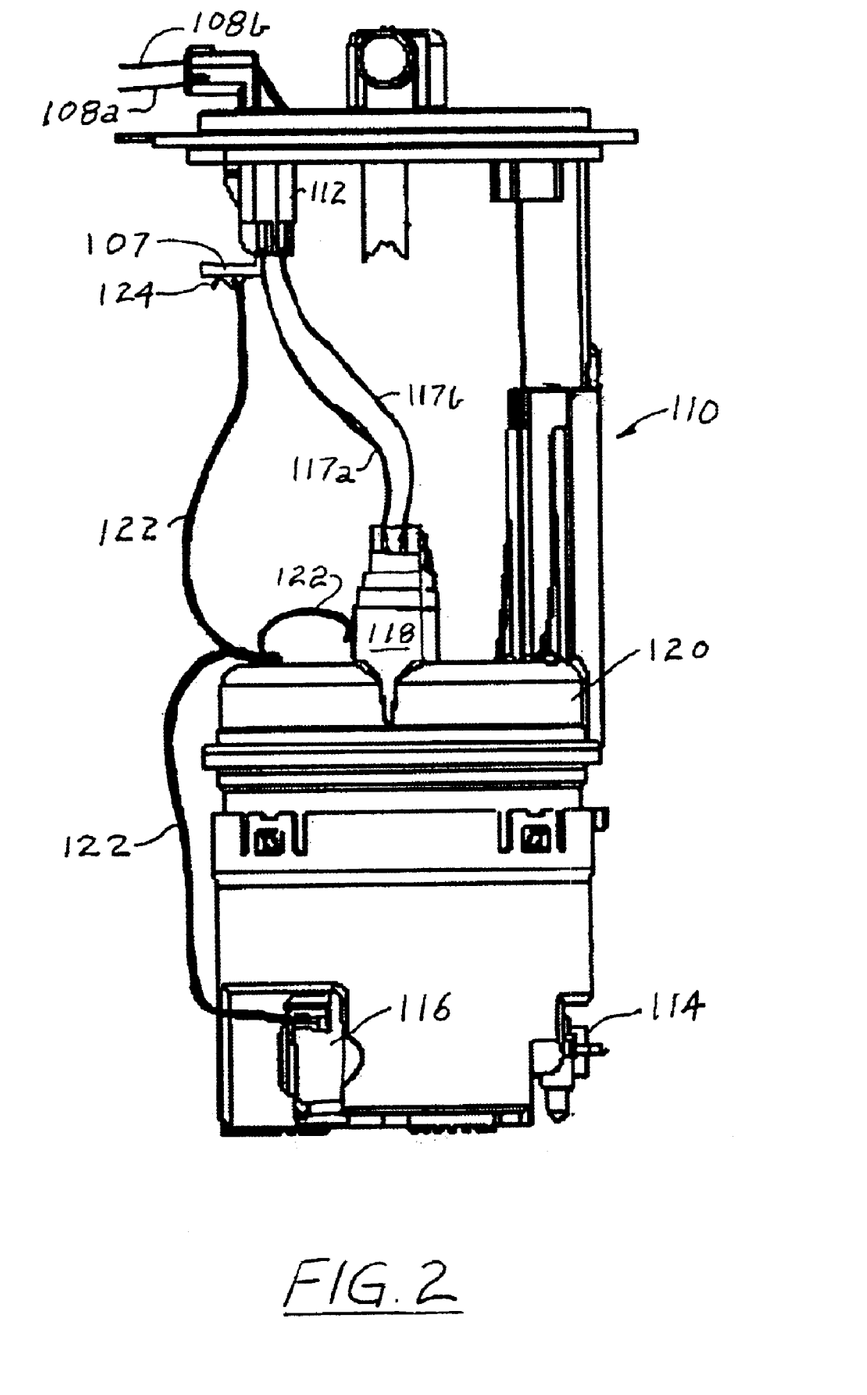
FIG. 2 is a partially broken away front view of another type of in-tank fuel module illustrating details of an embodiment of the present invention.

FIG. 2 shows another form of an in-tank fuel module having a plurality of separate components. The fuel module 110, includes a fuel level sensor assembly 114, a fuel pressure regulator 116, a fuel pump and motor 118 and a fuel filter housing 120 which houses a fuel filter (not shown).

An electrical plug or receptacle 112 is provided for connection to the vehicle electrical system. It includes at least a positive and a negative terminal. Positive and negative leads 117a and 117b connect to the pump motor 118. The ground terminal lead 117a is electrically connected to a grounded portion of a vehicle or other chassis, which is, in turn connected to the negative terminal of the battery through lead 108a. Terminal lead 117b is connected to the positive side of the circuit through lead 108b.

A conductive bracket 107 is provided that is attached to lead 117a.

The fuel pressure regulator 116, the fuel pump and motor 118 and the fuel filter housing 120 all may be components or include elements in or on which accumulation of electrostatic charge may occur. To dissipate the electrostatic charge from the fuel pressure regulator 116, the fuel pump 118 and the fuel filter housing 120, the present invention uses conductive plastic or polymeric strands 122 to define an electrical conductor or electrically conductive path to the ground terminal lead 117a at the electrical plug 112. In FIG. 2, the strand or conductor extends from pressure regulator 116 to the fuel filter housing 120, and then to the bracket 107. This single strand thus connects two components of the module to the electrical system ground plane. Another strand 122 contacts the pump and motor 118 and connects to the first strand at the connection to the filter housing 120. Bracket 107 and receptacle 112 are not essential to the invention. These components merely illustrate an effective arrangement to connect strands 122 to the electrical circuit ground plane.

Conductive plastic or polymeric strands 122 can be easily secured to the components of the module that have elements formed of conductive polymeric material. Moreover, the relatively low conductivity of such conductive strands as compared to copper or other metallic wire is considered advantageous. A wire that is an excellent conductor may actually cause arcing across a poor physical connection. The high resistance of the conductive strand reduces current flow and minimizes the risk of an inadvertent arc.

The polymeric strands are connected to the negative battery terminal at receptacle 112. Bracket 107 includes a clip 124 to secure the strand 122 to the conductive bracket for a secure physical and electrically conductive connection.

Figure 3A:
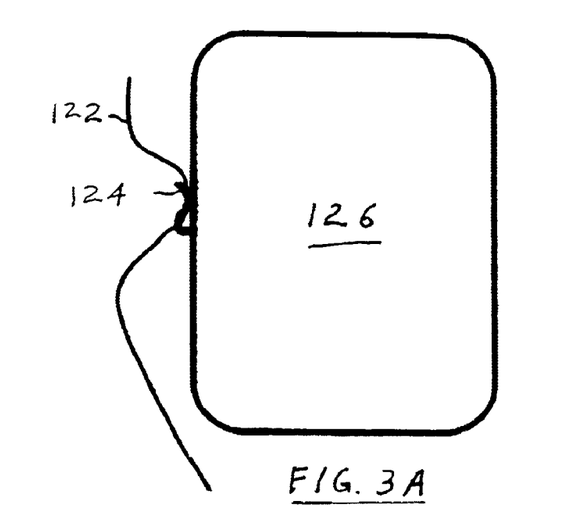
FIG. 3A is a side view of a portion of the in-tank module of FIG. 2 further illustrating features of the present invention.

The conductive plastic strands can be secured to the conductive components by a number of methods. FIG. 3A illustrates securing a conductive plastic strand 122 by pinching the conductive plastic strand 122 to a conductive component 126 with a flexible clip 124. The flexible clip 124 can be a metal clip that is attached to the conductive component 126. Alternatively, the flexible clip 124 can be a plastic clip molded into the side of the conductive component 126. The conductive plastic strand 122 is slid between the flexible clip 124 and conductive component 126, such that the flexible clip 124 pinches the conductive plastic strand 122 to the conductive component 126 to secure the conductive plastic strand 122 to the conductive component 126.

Figure 3B:
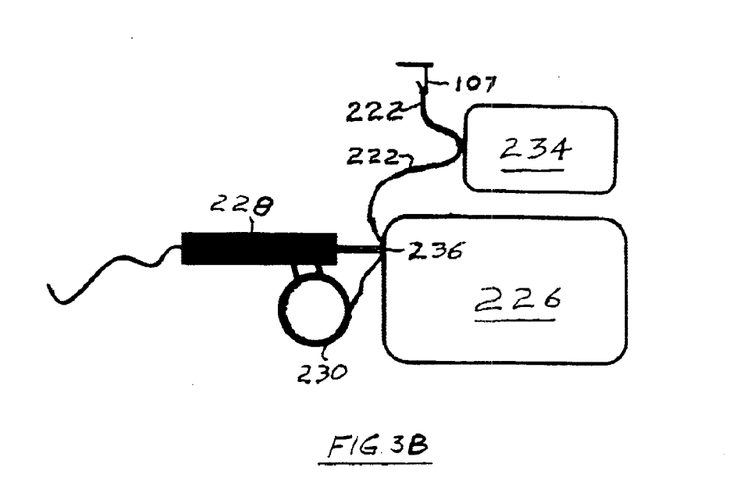
FIG. 3B is a side view of a portion of the in-tank module of FIG. 2 illustrating an assembly method embraced by the present invention.

FIG. 3B illustrates attachment of a conductive plastic strand 222 by ultrasonic, hot plate, or laser welding the conductive plastic strand 222 to the surface of a conductive plastic component 226. A welder 228, such as an ultrasonic, hot plate, or laser welder is used to weld one end of a conductive plastic strand 222 from a spool 230 of a length of conductive plastic strand 222 to a first conductive plastic component 226 to form a weld point 236. Thereafter, the conductive plastic strand 222 is unwound a given distance from the first weld point 236 to its connection to the bracket 107 connected to the negative terminal of the circuit or ground plane. Alternatively, as illustrated in FIG. 3B, the conductive plastic strand 222 may be ultrasonic, hot plate, or laser welded to a second conductive plastic component 234 using welder 228 to form a second weld point. Several conductive components may thus be connected together and the strand 222 then connected to the ground plane at bracket 107. It is important, however, to ensure that the overall electrical property of the strands not exceed an amount that would impede dissipation of any electrical charge.

Figure 4A:
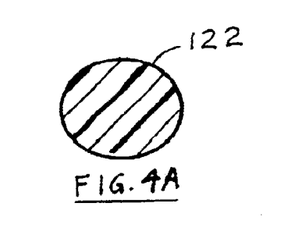
FIG. 4A is a cross section of a part of the apparatus of FIG. 2.
Figure 4B:
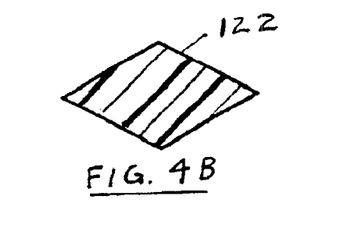
FIG. 4B is a cross section of a part of the apparatus of FIG. 2.
Figure 4C:
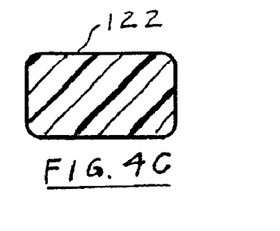
FIG. 4C is a cross section of a part of the apparatus of FIG. 2.

As illustrated in FIGS. 4A, 4B, and 4C, the conductive polymeric strands 122 or 222 may have any suitable cross sectional shape. FIG. 4A shows a strand 122 of oval cross section. FIG. 4B shows a strand 122 of generally diamond shaped cross section. FIG. 4C shows a strand 122 of generally rectangular cross section. The cross sectional shape of the strand shown in FIG. 4C has corners formed on a relatively large radius. Such large radius corner could also be employed in producing the strand of diamond shaped cross section illustrated in FIG. 4B. Similarly, the small radius corners of the cross section of FIG. 4B could be employed in the rectangular strand of FIG. 4C.

The strands 122 or 222 may also have a circular or a square cross section. It is thought that a cross sectional area for the strand 122 or 222 should be about 0.003 in$^2$ to 0.005 in$^2$. This, of course, would increase as the length from the component to the connection to the wire leading to the negative terminal increases.

The particular cross sectional shape is not known to be significant. However, the cross sectional area should be sized to control the resistance of the strand. It is contemplated that resistance should be in the order of $10^3$ to $10^9$ ohms per length of strand between the conductive element and the connection to the negative terminal 117a at bracket 107. In this regard, given the size of typical in-tank fuel modules the length of a strand between connection points can vary from 5 to 15 inches. If a strand connects two components together and then connects to the negative terminal 117a at bracket 107 the total length may be 20 inches or more.

The cross sectional size and resistance of the strands 122 and 222 are estimates. It is only significant that the resistance of the strand be such that any electrostatic charge that could accumulate as a result of flowing fuel be dissipated at a rate to prevent undesirable or dangerous accumulation of the charge. Thus, the rate of dissipation should be equal to or greater than the maximum rate of accumulation within a given component.

It should be understood that the values for resistance are estimated based on existing knowledge. These values could vary based on information not previously available or considered.

The conductive plastic strands of the present invention are preferably formed by extrusion of extrudable polymeric or plastic material that is rendered conductive by inclusion of a conductive additive. After forming, the extruded conductive plastic strand is wound in a spool and stored for later use.

The conductive plastic strand can be made conductive by mixing a base, non-conductive polymer, with about 1% to about 20% by weight of conductive filler additive. Other fillers, like glass fibers in an amount of up to about 20% by weight, may also be used for adding strength.

A suitable conductive filler additive includes carbon powder, carbon fiber or carbon fibril, or metallic materials in the form of powder or fiber. Raw material for conductive "Nylon 12" with 4% conductive filler and 19% glass fiber filler is available from Huls DeGussa, Farmington Hills, Mich. The conductive filler is carbon fibrils made by Hyperion Catalyst International, Boston, Mass.

Carbon fibril is able to achieve the desired conductivity level without adverse effect on the mechanical properties and fuel resistance properties of the strand. Therefore, carbon fibril is the preferred conductive filler additive based solely on its mechanical and fuel resistance properties. However, carbon fibril is generally more expensive than carbon power and carbon fiber. Therefore, in most situations where mechanical and resistance properties are not important properties for the conductive plastic strands, the use of carbon power or carbon fiber is acceptable.

Metallic conductive filler such as silver, copper or steel in powder or fiber form can also be utilized. In addition, an inherently conductive polymer or inherently dissipative polymer can also be used as the conductive filler.

The base plastic or polymeric material can be nylon or acetal. Nylon is easier to extrude than acetal. Therefore, based solely on processing the conductive plastic strands, nylon is the preferred base plastic material. However, it is very difficult to weld dissimilar materials. Most injection molded components in the fuel module are formed from acetal due to its low cost compared to nylon, as well as good fuel resistance for acetal with very low swelling. Therefore, should the conductive component to which the conductive plastic strand is to be secured be formed from acetal, and the method of securing the conduct plastic strand to the conductive component is by ultrasonic, hot plate or laser welding, acetal would be the preferred base plastic material for forming the conductive plastic strand. If a metal or polymeric clip were used, a conductive nylon strand could be used.

Turning now to FIGS. 5 through 12, a fuel level sensor assembly 412 is shown in accordance to another aspect of the present invention. The fuel level sensor assembly 412 includes a fixed assembly base 438 mounted to the in-tank module such as at the fuel filter housing 120, as shown in FIG. 2. A metallic float arm 440 mounted on a wiper retainer 444 near one end. The float arm 440 has a buoyant float 442 at the other end. The retainer 444 and consequently float arm 440 are pivotally mounted on base 438.

Figure 5:
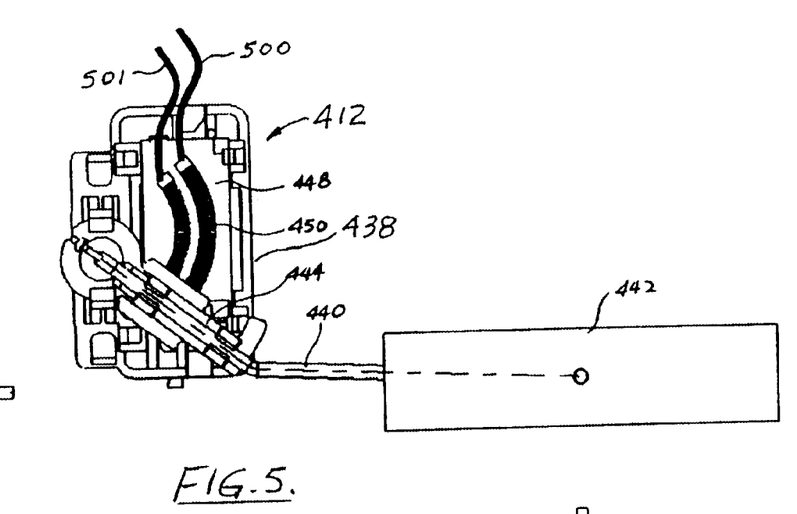
FIG. 5 is a front view of a fuel level sensor assembly incorporating principles in accordance with the present invention.
Figure 6:
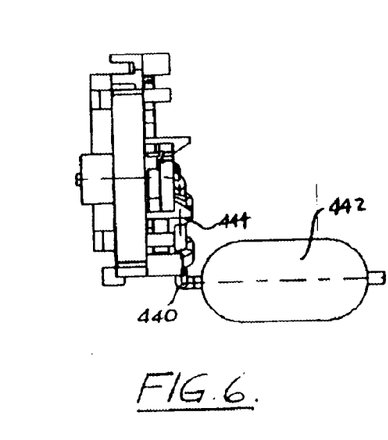
FIG. 6 is a side view of the fuel level sensor assembly of FIG. 5.
Figure 7:
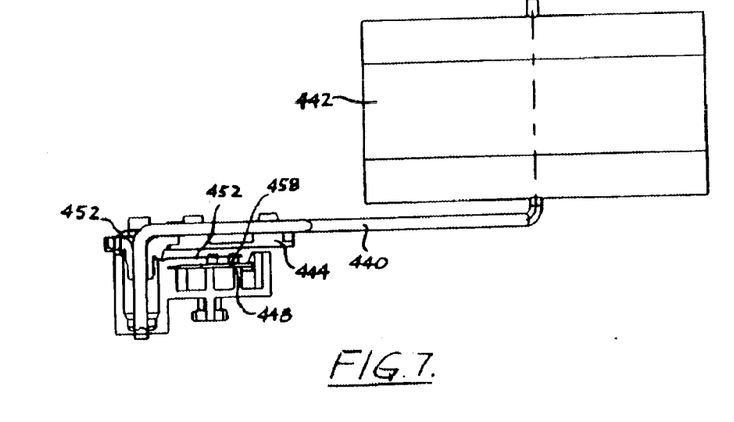
FIG. 7 is a top view of the fuel level sensor assembly of FIG. 5.

Located underneath the contact retainer 444, on the surface opposite the mounting surface for the float arm, is a contact member 446. Below the contact member 446 on base 438 is a resister card 448 which forms a part of a circuit associated with the fuel level indicator. As is usual, and well known, the circuit is connected to the battery circuit and therefore provides a path to the negative battery terminal or ground plane.

The resister card 448 includes a pair of separate traces 450 that typically extend in an a parallel pattern that is arc shaped. As the level of the fuel changes, the float 442 moves up and down causing the float arm 440 and retainer 444 to pivot. As the float arm 440 pivots, contacts 458 on contact member 446 move along the arc shaped conductive traces 450 of the resistor card 448, which then alters the characteristics of the circuit and thus the signal sent to the fuel level indicator (not shown).

A wire 500 enters the module through receptacle 17 of FIG. 1, and connects to a first pattern of traces 450 at an end of the resister card 448. A second wire 501 connects between the receptacle 17 the other pattern of traces 450 on card 448. Wire 501 is suitably connected to the negative battery terminal ground plane of the system through the receptacle 17. It could, however, be connected to the ground plane through any other suitable arrangement.

The contact member 446 of the present invention has a conductive finger 452 that contacts float arm 440. As illustrated, the conductive finger 452 is an extension of the contact member 446. It could, however, take the form of a separate conductive bracket (not shown) electrically connecting the float arm to the contact member, a metallic wire (not shown) electrically connecting the float arm to the contact member or a conductive plastic strand (not shown) connecting the float arm to the contact member. While all the above listed conductive portions are effective in electrically connecting the float arm to the contact member, the preferred form is the conductive finger extension of the contact member 446 illustrated in the drawings. By using the finger on the contact member 446, no additional parts are required for the electrical connection. This approach saves assembly time and money, and eliminates some failure modes, such as a potentially loose or disconnected wire.

Figure 8:
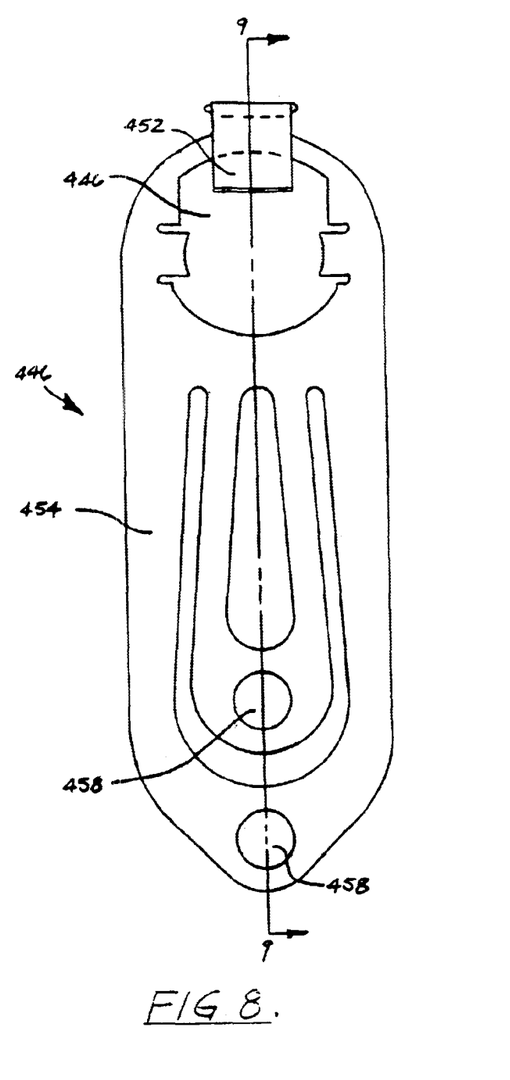
FIG. 8 is a front view of a contact member element of the fuel level sensor assembly of FIG. 5.
Figure 9:
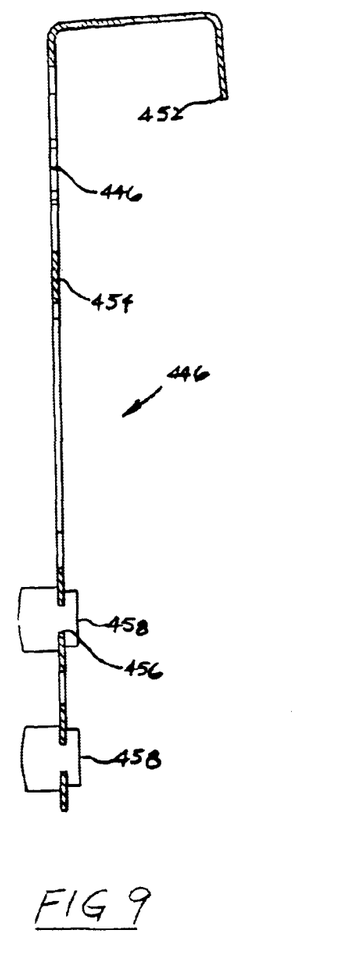
FIG. 9 is a sectional view of the contact member element of FIG. 8 taken along line 9—9.

FIGS. 8 and 9 illustrate a contact member 446 prior to installation onto a contact retainer 444. The contact member 446 has a main plate 454 defining two small apertures 456 for attaching cylindrical contacts 454. The cylindrical contacts 454 are adapted to contact the traces 450 of the resistor card 448. The circuit across the separate traces 450 is completed through contact member 446. The main plate 454 also defines a large aperture 460 adapted for attaching the contact member 446 to the wiper retainer 444. Extending from the end of the main plate 454 is the conductive finger 452. The terminal end of the conductive finger 452 is adapted to contact the float arm 440 to form an electrical path to discharge any electrostatic charge collected in the float arm 440 to the circuit defined by the traces 450 and wires 500 and 501. The contact member 446 depicted here is one example of such a component. Various other contact member configurations and methods of attachment to the contact retainer may be employed without deviating from the present invention.

Figure 10:
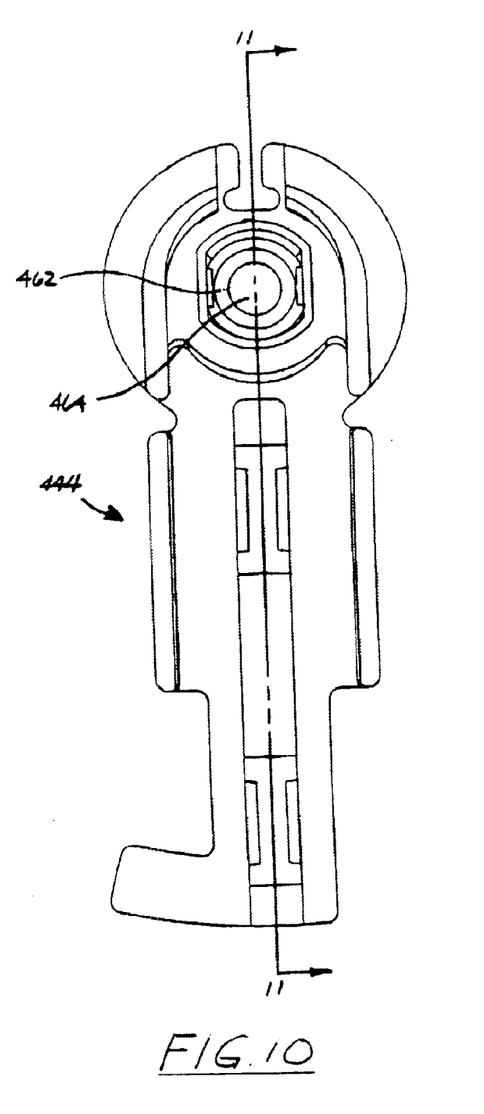
FIG. 10 is a front view of the float arm retainer element of the fuel level sensor assembly of FIG. 5.
Figure 11:
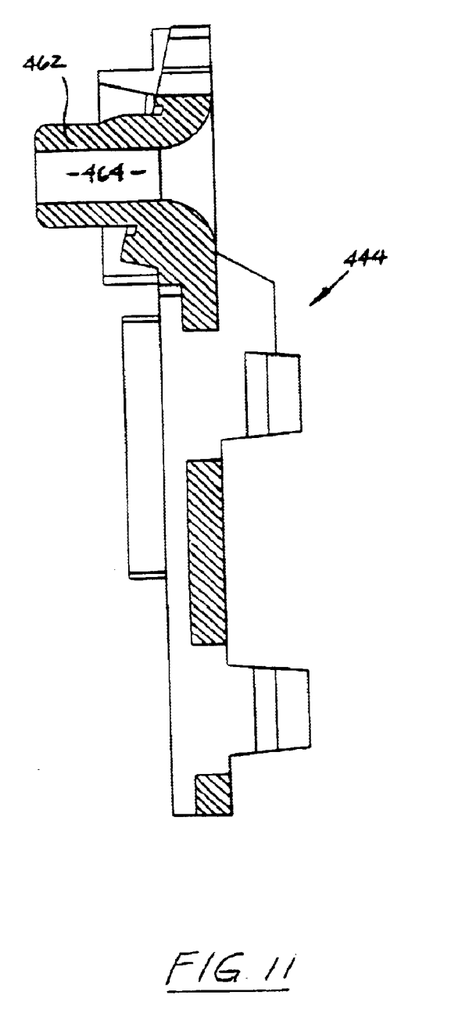
FIG. 11 is a sectional view of the float arm retainer element of FIG. 5 taken along line 11—11.

FIGS. 10 and 11 illustrate the contact retainer 444 to which the contact member 446 according the present invention is attached. The contact retainer 444 has a protrusion 462 adapted to be received in the large aperture 460 of the main plate 454 of the contact member 460. The protrusion 462 pivotally mounts the wiper retainer on the base 438.

A bore 464 extends through the protrusion 462. The bore 464 is adapted to receive one end portion of the float arm 440.

Figure 12:
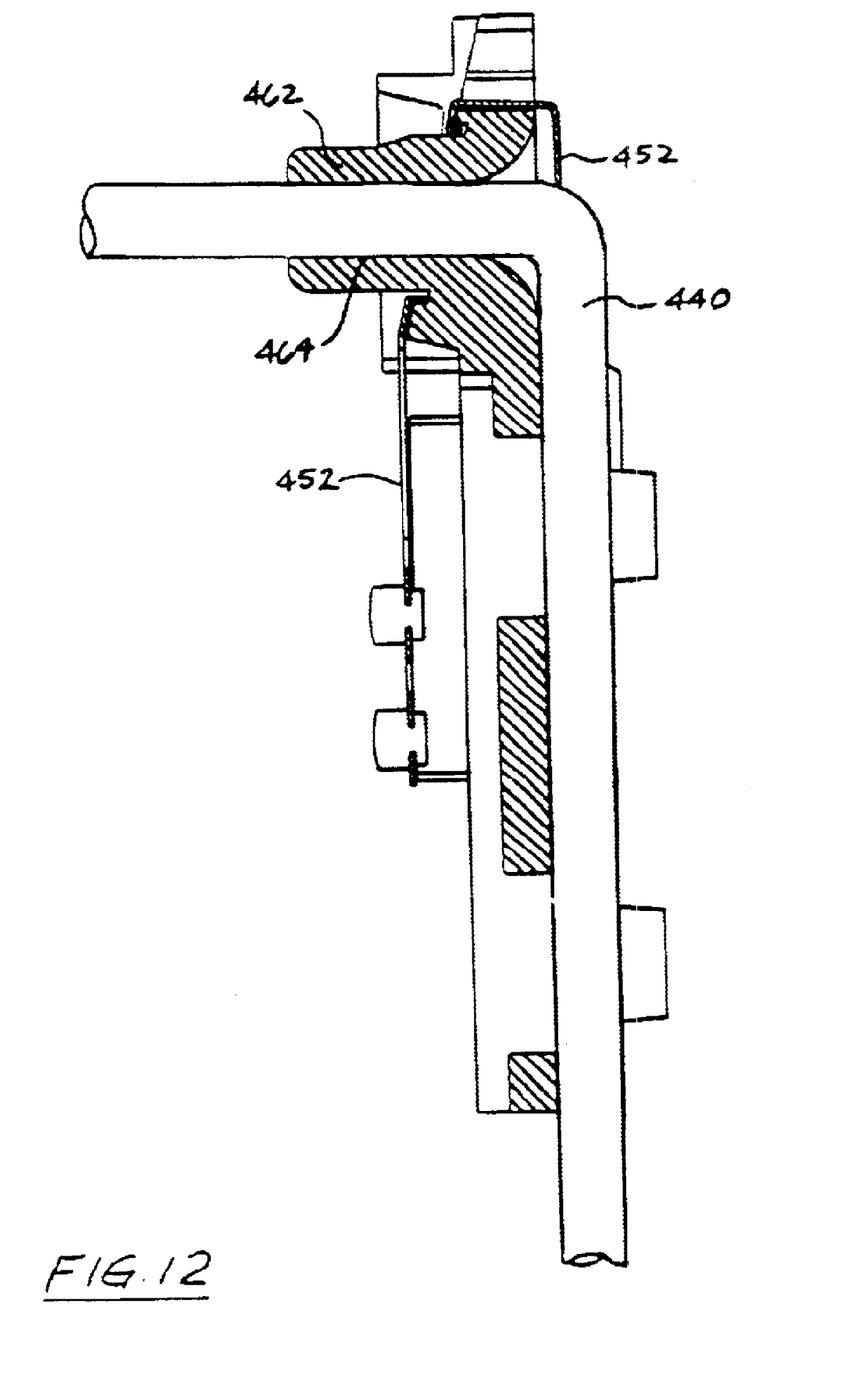
FIG. 12 is a sectional view of the contact member installed onto the float arm retainer element with a conductive finger formed on the contact member and a float arm extending through the float arm retainer.

FIG. 12 illustrates the contact member 446, as illustrated in FIGS. 8 and 9, attached to the contact retainer 444, as illustrated in FIGS. 10 and 11. FIG. 12 further illustrates end portion of the float arm 440 extending through the bore 464 of the contact retainer 444.

The conductive finger 452 of the contact member 446 is in contact with the float arm 440. The conductive finger 452 creates an electrical path for any electrostatic charge in the wiper arm 440 to travel to ground in a safe manner. The electrostatic charge in the float arm 440 travels from the float arm 440, through the conductive finger 454, to the main plate 454 of the contact member 446, into the traces 450 of resister card 448 and to ground via the wires 500 and 501 attached to the traces on resister card 448.

It is contemplated that, alternatively, the contact retainer itself can be conductive. The conductive contact retainer can be made conductive by mixing a base non-conductive polymer, such as acetal, with conductive filler additive, such as carbon fiber or carbon fibrils. It would then connect the metal float arm 440 to ground through the contact member 446 and contacts 454 which electrically contact the traces 450 of the resister card 448.

Various features of the present invention have been described with reference to the above embodiments. It should be understood that modification may be made without departing from the spirit and scope of the invention, as represented by the following claims.

What is claimed is:

1. An in-tank fuel module fuel level sensor assembly including an electrical conductor for connection to a ground plane of an electrical system;

said electrical conductor including a variable resistor arrangement;

a conductive connection extending from said variable resistor arrangement and in electrical contact therewith;

said in-tank fuel module including a conductive component connected only to said conductive connection, said conductive component otherwise isolated from the electrical system.

2. A fuel level sensor assembly as claimed in claim 1 further comprising:

a base contact retainer pivotally mounted on said base wherein;

said conductive component comprises a conductive float arm mounted to said contact retainer;

said variable resistor arrangement comprises a resister card including a plurality of parallel and separated traces connected through resisters to the ground plane;

a contact member on said contact retainer contacting said separated traces;

said conductive connection extends between said conductive float arm and said contact member; and being connected to the ground plane through said traces.

3. The fuel level sensor as claimed in claim 2 wherein said contact member includes a metallic wire.

4. The fuel level sensor as claimed in claim 2 wherein said contact member includes a conductive plastic strand.

5. The fuel level sensor as claimed in claim 2 wherein said contact retainer is conductive and defines said contact member.

* * * * *